United States Patent
Zingher et al.

[11] Patent Number: 5,731,575
[45] Date of Patent: Mar. 24, 1998

[54] COMPUTERIZED SYSTEM FOR DISCREET IDENTIFICATION OF DURESS TRANSACTION AND/OR DURESS ACCESS

[76] Inventors: Joseph P. Zingher, 2217 Marquette Rd., #D-1, Peru, Ill. 61354; Abraham R. Zingher, 10204 W. California, Zion, Ill. 60099

[21] Appl. No.: 844,626

[22] Filed: Apr. 21, 1997

Related U.S. Application Data

[63] Continuation of Ser. No. 329,457, Oct. 26, 1994, abandoned.

[51] Int. Cl.[6] ............................................. G06F 17/60
[52] U.S. Cl. ........................... 235/379; 235/380; 902/5
[58] Field of Search ............................ 235/379, 380; 902/5; 340/825.32, 825.36

[56] References Cited

U.S. PATENT DOCUMENTS

| | | | |
|---|---|---|---|
| 3,633,167 | 1/1972 | Hedin | 340/825.32 |
| 4,234,932 | 11/1980 | Gorgens | 364/900 |
| 4,390,968 | 6/1983 | Hennessy et al. | 235/379 X |
| 4,420,751 | 12/1983 | Paganini et al. | 340/825.33 |
| 4,675,815 | 6/1987 | Kuroki et al. | 379/37 |
| 4,760,245 | 7/1988 | Fukaya | 235/379 |
| 5,130,519 | 7/1992 | Bush et al. | 235/379 X |
| 5,132,521 | 7/1992 | Smith et al. | 235/379 X |
| 5,239,583 | 8/1993 | Parrillo | 235/379 X |
| 5,259,025 | 11/1993 | Monroe et al. | 235/379 X |
| 5,354,974 | 10/1994 | Eisenberg | 235/379 |
| 5,386,104 | 1/1995 | Sime | 235/379 |

FOREIGN PATENT DOCUMENTS 3529167  2/1987  Germany.

OTHER PUBLICATIONS

"An A.T.M. Safeguard", *New York Times*, Aug. 13, 1994.
"Bank Brings Safety Net of 911 of Cash Machine", *Chicago Tribune*, Aug. 19, 1994, p. 2.

*Primary Examiner*—Hoanganh T. Le
*Assistant Examiner*—Michael G. Lee
*Attorney, Agent, or Firm*—Patula & Associates

[57] ABSTRACT

A system and method for the discrete identification of a duress transaction at an ATM banking machine. The system and method allows the customer to alert the police that a crime is taking place without alerting the criminal that an alarm has been given by the entry of an access number equating to a non-prestored personal distress or emergency number in place of the stored PIN number. When an access number is entered to begin a transaction, the system compares the entered access number with the prestored PIN number. If the entered access number is the same as the PIN number, the transaction proceeds as normal. If not, an algorithmic function is applied to either the entered access number or the PIN number. These two number are then again compared and if after application of the algorithmic function they are the same, then the duress signal is triggered. Thus, the non-prestored personal distress number is successfully entered when the access number entered to begin the transaction equates to the PIN number after the algorithmic function is applied to either the entered access number or the PIN number. As such, the system and method facilitates recall of a non-prestored personal distress number.

31 Claims, 9 Drawing Sheets

COMPUTERIZED SYSTEM FOR DISCREET IDENTIFICATION OF DURESS TRANSACTION AND/OR DURESS ACCESS

This application is a continuation of parent application Ser. No. 08/329,457 filed on Oct. 26, 1994, now abandoned.

This invention relates to computerized transactions, and more particularly, to a system and method for identifying duress during a computerized transaction, specifically a computerized system and method for discreetly identifying involuntary transactions at automatic teller machines.

BACKGROUND OF THE INVENTION

With the advent of the Automatic Teller Machine (ATM), it has become possible for banking withdrawals to be made without the intervention of human bank personnel or agents. While this has been extremely beneficial to both the banks and their customers in many ways, it has enabled felons to extort money from ATM users. The usual form of this extortion is to intimidate the ATM user by threat of physical harm. Until now, there has been no adequate way for the ATM user to signal distress without alerting the felon along with the authorities.

ATMs are commonplace and their operation is familiar to virtually the entire population of the United States, and elsewhere throughout the world. This familiarity is a major problem for security. ATMs also make a tempting target for violent criminals, placing their users at risk of robbery and violence. Accordingly, there is a need for a system and method for preventing the forced withdrawal of cash from an ATM or for signalling the authorities of a duress transaction, that will not endanger the cardholder.

There have been attempts to safeguard ATM machines, however, such attempts do not adequately protect the ATM victim without alerting the ATM robber. For example, placing a "panic button" on an ATM, although one method of notifying the police, may also trigger a violent response from the criminal.

Other known systems for raising a duress signal involve adding an extra-digit to an access code, e.g., home security system panic codes, or inserting a string of code that will alert the computer system that a transaction was made under duress. In those instances, a criminal with a comparable knowledge of the workings of the system would realize that an alarm had been given, placing the victim in immediate danger of retaliation. Such systems could prove fatal if the robber is looking for any "false move" on the part of the victim.

Merely adding an emergency digit to an access code for use in known systems has several problems. This is because the regular Personal Identification Number (PIN) or access code in known systems must have some termination point. If a six digit PIN is the greatest length that a regular PIN can be, the felon will recognize that an alarm has been given by a seven digit entry. Such a system could theoretically protect a number of the cardholders, but there would still be a fair number of users at great risk. The fault in the system is that by knowing what the greatest length a PIN could be makes the extra emergency digit useless.

Basically, any act on the part of the victim other than entering a four-digit PIN (or the usual number of digits if other than four) will result in alerting the criminal that his crime has been reported. During the course of a robbery, the victim is under stress, and needs a simple, hard to forget discreet method of alerting the police.

There are known systems which are used for security in various computerized transactions. For example, U.S. Pat. No. 4,234,932 issued to Gorgens discloses a security system for remote cash dispensers. Gorgens' invention is a system to prevent theft by the interception and simulation of the information exchanged between the central computer and the remote transaction terminal (ATM). Gorgens' invention in effect scrambles the user's information to make deciphering difficult and stolen information unusable. Gorgens differs from the present invention in that, unlike the present invention, Gorgens does not provide a system that will allow a user to signal the authorities that a transaction is being made under duress or being forcefully made.

U.S. Pat. No. 4,390,968, issued to Hennessy, et al., discloses an automated bank transaction security system providing security measures to prevent the unauthorized access to a costumer's account. The invention of Hennessy, et al. prevents the transmission of signals from which a PIN may be derived over transmission lines available to unauthorized users. The invention of Hennessy, et al. differs from the present invention because the present invention provides a system to identify and discreetly notify the authorities of a duress transaction. Hennessy, et al. does not provide for the identification and notification of duress transactions.

U.S. Pat. No. 4,420,751, issued to Paganini, et al. discloses a detection method and apparatus for a user device or automatic teller bank machine. Paganini, et al.'s system detects the presence of a user so that user instructions may be generated by the ATM's computer. The present invention differs from Paganini, et al. because it provides for the discreet identification and notification of a duress transaction. Paganini, et al. makes no provisions for sounding an alarm or notifying the police of an emergency.

U.S. Pat. No. 4,675,815, issued to Kuroki, et al. discloses a transaction safety system for falsely indicating successful completion of illegal transaction. Kuroki, et al.'s system is for use with a portable monetary transaction device which is connected via a telephone line to a central processing unit of a banking facility. Kuroki, et al.'s system utilizes an SOS signal which is entered through a keyboard during the input process. The banks processing center then prevents access to the costumer's account and delivers false information that the transaction has been successful. Kuroki, et al. differs from the present invention in that in the present invention, the user's account must be successfully entered and transaction completed in an attempt to avoid physical harm from a robber. Further, to be successful, the present invention must allow for the discreet notification of a duress transaction without tipping off an attentive robber, who is familiar with the system. Since accessing an ATM utilizing the present invention typically only requires entering a four digit number, any entry of anything other than a four digit number could be disastrous. Kuroki, et al.'s system involves numerous inputs from a keyboard to complete the transaction and, for this reason, can allow for the undetected entry of an SOS code. However, the system of Kuroki, et al. will not work if the criminal is as familiar with the system as the public is with ATM systems. Further, unlike the present invention, Kuroki, et al. does not notify or signal the authorities as to where the crime is being committed.

Accordingly, there is a need for the discreet identification of a duress transaction and the discreet notification to authorities that a crime is being committed at an ATM machine. The present invention solves these problems by providing a system and method of discreetly identifying duress transactions and/or duress access to an ATM machine.

BRIEF SUMMARY OF THE INVENTION

The present invention is a system and method for discreetly identifying and signalling a duress transaction at an Automatic Teller Machine or other computerized system through the use of a Personal Distress Number or PDN for short. The PDN is used by an ATM customer to signal both banking and law enforcement authorities that the user is under duress and to send help without alerting the felon that the victim is calling for help. The PDN can be identical in length to that of the PIN used by the same system. Thus a PDN could be entered instead of a PIN with actions that could not be distinguished from those that are used to enter a PIN by a felon. The actions displayed by the ATM accepting a PDN could be made indistinguishable from those displayed by an ATM accepting a PIN.

The system and method of the present invention is a safe and efficient way to make all ATMs the equivalent of a 911 emergency line. The system provides a simple, certain and secure way of allowing the customer to alert the police that a crime is taking place without alerting the criminal that an alarm has been given. Using the "duress PIN" or PDN number would trigger a silent alarm connected to the nearest police station initiating a police response.

There are a number of methods by which a PDN may be implemented. A first method is what could be described as a general PDN number which could be randomly assigned. A second method is what could be described as an altered PIN number. This second method, a subject of the present invention, comprises: (1) a typical prestored PIN number prestored in the memory banks of the bank computer or on the magnetic strip of the costumer's card, and (2) an algorithm which may alter the PIN number to achieve a PDN number. The advantages of employing an altered PIN number as a costumer's PDN number, rather than a prestored PDN number, are quickly realized by a bank upgrading an ATM system to include a distress system. Such a bank need only program the algorithm into the computer system to make the present system operative rather than program a separate PDN number for each customer and/or reissue cards to each customer identifying these new PDN numbers. Further, there are various options that the system can take once the PDN has been entered. These will be described in more detail below.

The crux of the system is in covertly alerting the computer system that the transaction being performed is not voluntary. In response, the ATM could either slow down the transaction time, giving police more time to respond, limit the funds available from that person's account so that the robber cannot get away with enormous sums of money, or reject the transaction with an "unable to complete transaction" message, and then, on any subsequent attempts, slow down the transaction. Further, the entire ATM system could be alerted city or nationwide to the fact that a forced transaction has occurred. If the criminal makes it away from the first location and attempts to force another withdrawal, the system could alert the police the moment that the card was inserted again. Still further, along with the alarm, the system could give a general description of the cardholder for the police to use, thus avoiding a potential tragedy because of a mistaken identity, as well as giving the police an extra edge in spotting the parties involved.

The most important feature of this process of raising an alarm is that even though the criminal is perfectly familiar with the system, the alarm can be covertly given right in front of him.

Accordingly, it is the principle object of the present invention to provide a security system for an ATM.

It is the further object of the invention to provide a system for identifying an involuntary transaction at an ATM and notifying the police.

It is also the object of the present invention to provide a simple, hard-to-forget method of alerting the police during the course of an ATM robbery, while the victim is under stress.

It is an additional object of the invention to provide a system that discreetly notifies the police of a duress transaction while slowing down the transaction to provide time for the police to respond.

Numerous other advantages and features of the invention will become readily apparent from the detailed description of the preferred embodiment of the invention, from the claims, and from the accompanying drawings in which like numerals are employed to designate like parts throughout the same.

BRIEF DESCRIPTION OF THE DRAWINGS

A fuller understanding of the foregoing may be had by reference to the accompanying drawings wherein.

DETAILED DESCRIPTION OF THE PREFERRED EMBODIMENT OF THE PRESENT INVENTION

While the invention is susceptible of embodiment in many different forms, there is shown in the drawings and will be described herein in detail, a preferred embodiment of the invention. It should be understood, however, that the present disclosure is to be considered an exemplification of the principles of the invention and is not intended to limit the spirit and scope of the invention and/or claims of the embodiment illustrated.

FIGS. 1 through 13 illustrate the system and method of the present invention, as well as alternate embodiments, in use with an ATM machine 12, such as that illustrated in FIG.

Figure 1:
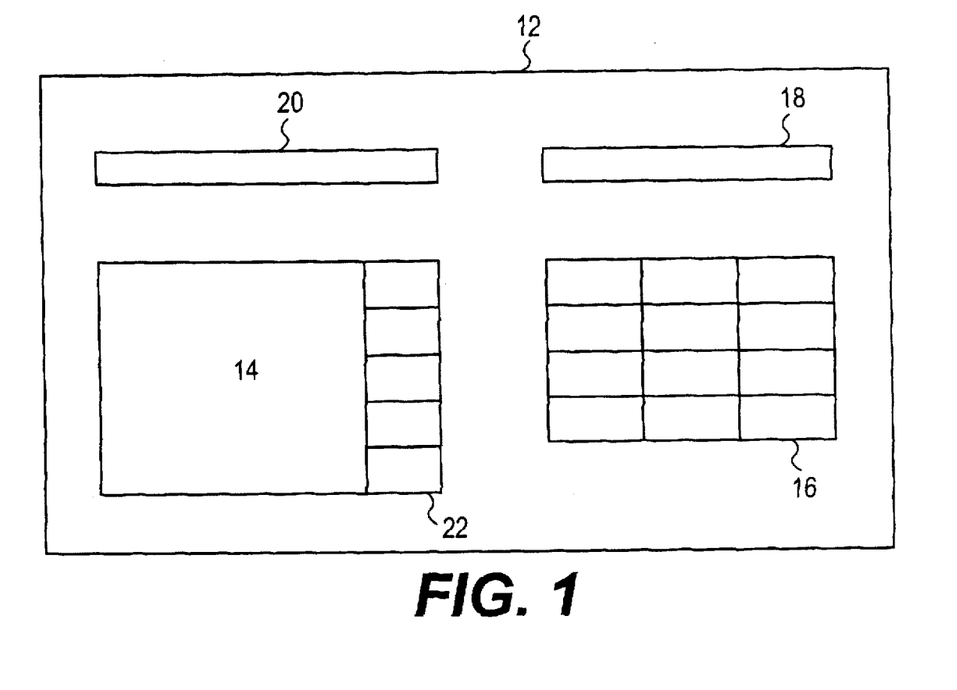
FIG. 1 is a front view of a prior art automatic teller machine.

1, having a display 14, a keypad 16, a card reader 18, and a cash dispenser 20. Function buttons 22 are further illustrated next to display 14. ATM machine 12 further includes computer means for detecting a PIN number prestored in the bank computer system (See FIG. 2).

During an ATM transaction, the ATM "recognizes" an account holder based on the PIN number. Let A-B-C-D represent any PIN number, where each digit is unique from any other digit in the PIN. During the recognition phase of entering the PIN, the ATM computer recognizes "A-B-C-D" as the correct PIN. When an incorrect PIN number is entered, the computer recognizes, for example, "A-B-C-E" or "A-B-D-C" as incorrect and rejects the request. The present invention is generally illustrated by the addition of another step during the recognition process.

For example, if a user under duress purposely enters the PIN number in reverse order, i.e., "D-C-B-A", the computer can be programmed to recognize that the correct PIN was entered in reverse, or that the PDN was entered. Rather than reject the PIN as faulty, the computer could then notify the nearest police station that the person withdrawing the cash is under duress. Notification to the authorities can be accomplished through the use of a telephone dialer with prerecorded message or a "silent" alarm, such as an alarm system similar to a jewelry store's or a bank's burglar alarm. Police would then have "real-time" notice that a crime is in progress.

Figure 2:
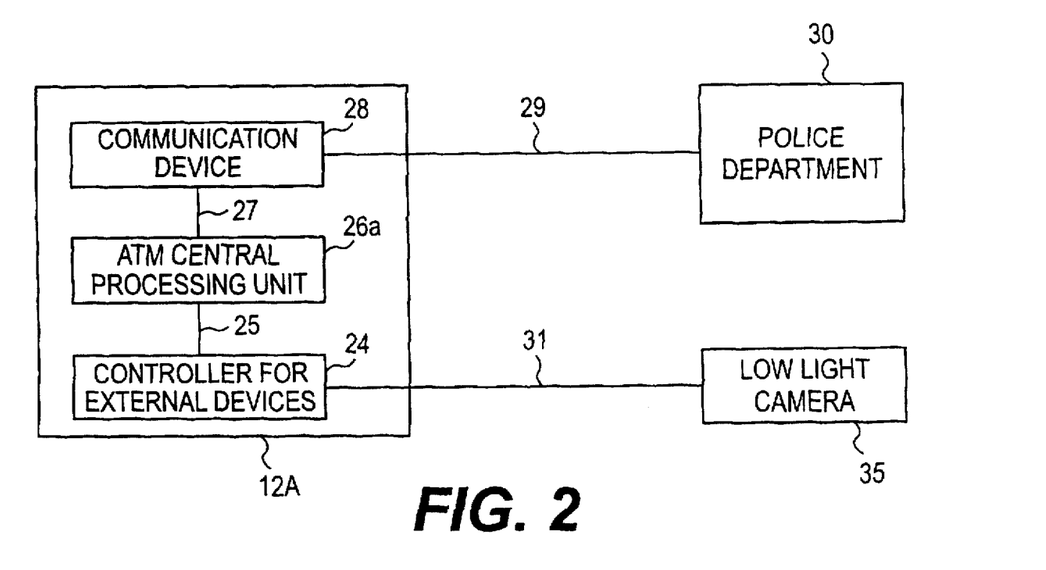
FIG. 2 is a schematic view of the system of the present invention.
Figure 3:
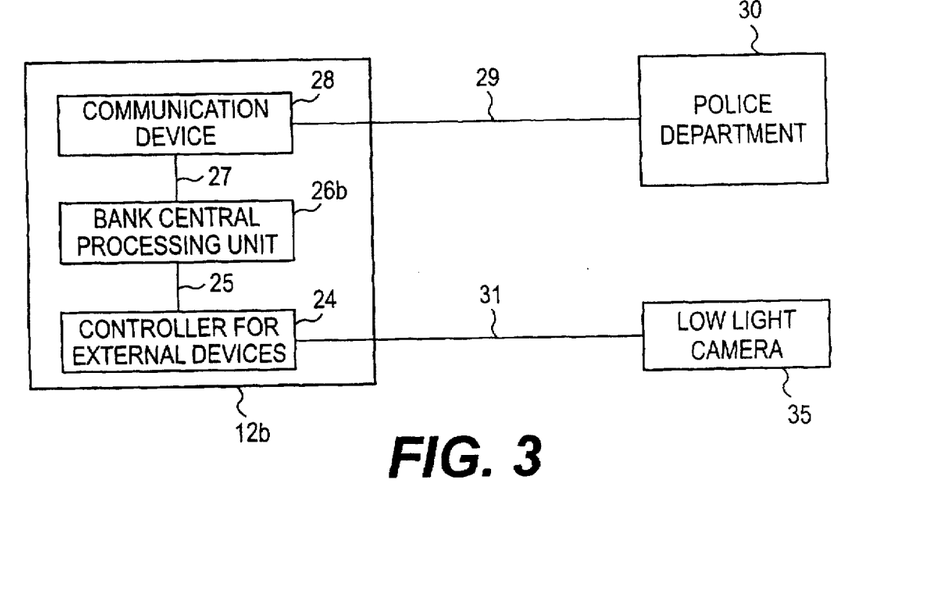
FIG. 3 is a schematic view of an alternate embodiment of the system of the present invention.
Figure 4:
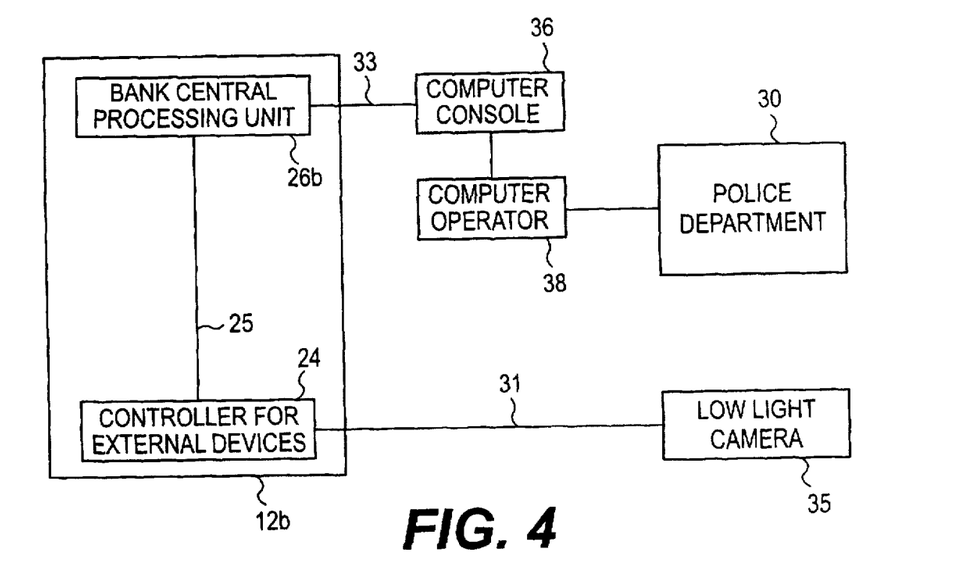
FIG. 4 is a schematic view of an alternate embodiment of the system of the present invention of FIG. 2.

FIGS. 2-4 illustrate the ATM duress system of the present invention. The ATM machine of the present invention can take two different forms. The ATM machine can have its own separate central processing unit, or it could be directly linked to the bank's central processing unit. FIG. 2 illustrates ATM machine 12a having its own central processing unit (CPU) 26a. ATM machine 12a further includes a controller 24 for controlling the external devices of the ATM machine, and a communication device 28 such as a telephone dialer with a prerecorded message. The controller 24 is operatively associated with the central processing unit 26a via a data link 25. The ATM central processing unit 26a performs the PDN validation process, which will be described in more detail with reference to FIGS. 5-8 and 11.

Upon detection that a PDN has been entered, the CPU 26a, via a data link 27, will inform the communication device 28 to contact the appropriate authorities. For example, a telecommunication dialer, via a data link 29 (phone line, etc.) will contact the police department's dispatch center's telephone or computer system 30, thereby discreetly informing the police that a duress transaction is occurring. Communication device 28 can send a prerecorded message to the police indicating the location of the duress transaction and the name of the individual under duress. By use of a physical description of the rightful cardholder encoded on the magnetic strip on the ATM card, the ATM computer could also send a description of the victim to the police, thus assisting in the identification of the victim and thereby the robber. Further, ATM machine 12a is preferably connected via a data link 31 to a low light camera 35, which will be described in more detail in reference to FIG. 9.

FIG. 3 illustrates ATM machine 12b being connected directly to the bank's central processing unit (CPU) 26b. ATM machine 12b further includes a controller 24 for controlling the external devices of the ATM machine, and a communication device 28 such as a telephone dialer with a prerecorded message. The controller 24 is operatively associated with the central processing unit 26b via a data link 25.

The bank's central processing unit 26b performs the PDN validation process, which will be described in more detail with reference to FIGS. 5-8 and 11.

Upon detection that a PDN has been entered, the CPU 26b, via a data link 27, will inform the communication device 28 to contact the appropriate authorities. For example, a telecommunication dialer, via a data link 29 (phone line, etc.) will contact the police department's dispatch center's telephone or computer system 30, thereby discreetly informing the police that a duress transaction is occurring. Communication device 28 can send a prerecorded message to the police indicating the location of the duress transaction and the name of the individual under duress. Further, ATM machine 12b is preferably connected via a data link 31 to a low light camera 35, which will be described in more detail in reference to FIG. 9.

FIG. 4 illustrates an alternate embodiment of the system of the present invention wherein ATM machine 12b is connected directly to the bank's central processing unit (CPU) 26b. ATM machine 12b further includes a controller 24 for controlling the external devices of the ATM machine. The controller 24 is operatively associated with the central processing unit 26b via a data link 25. The bank's central processing unit 26b performs the PDN validation process, which will be described in more detail with reference to FIGS. 5-8 and 11.

Upon detection that a PDN has been entered, the CPU 26b, via a data link 33, will send an alarm signal with the appropriate information, via data link 33, to a computer console 36 at a remote location. An operator 38 monitoring the computer console 36 will then notify or contact the appropriate authorities, such as police department 30. Further, ATM machine 12b is preferably connected via a data link 31 to a low light camera 35, which will be described in more detail in reference to FIG. 9.

Figure 5:
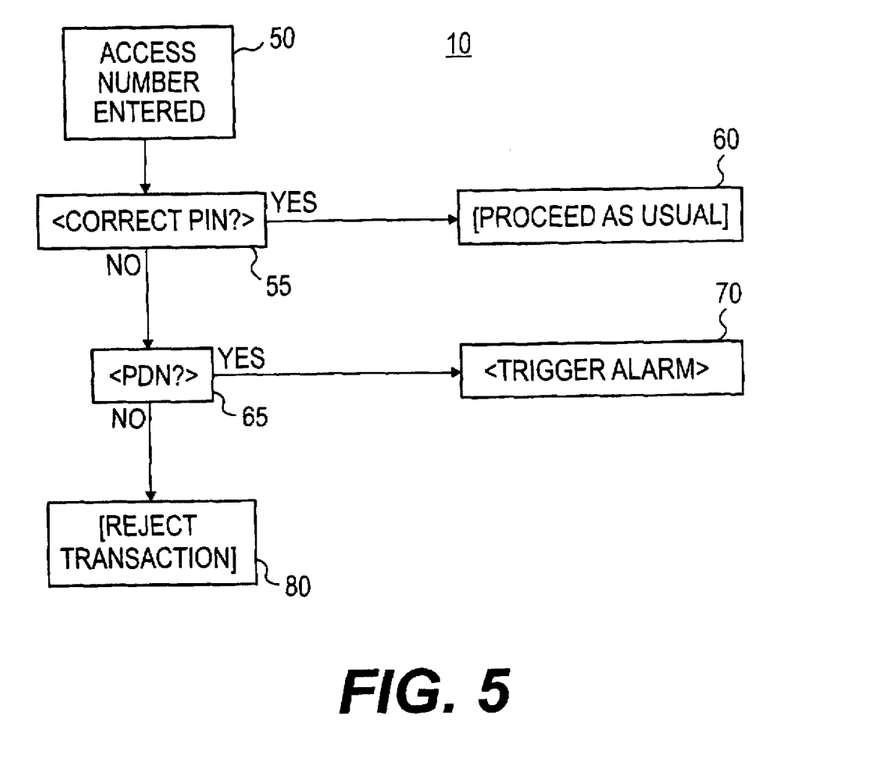
FIG. 5 is a flow chart of the system and method of present invention.

Referring now in particular to FIG. 5, the general PDN system and method of the present invention 10 is illustrated. This method is accomplished by adding to the Customer's Information File in the ATM system, an additional "duress PIN" number or PDN. (A Customer's Information File is the file which keeps the information relevant to an individual costumer's accounts at the bank where he does business.)

The PDN would be a number randomly chosen by the customer, so that it would be easily remembered by the customer and not confused by the customer with that customers regular PIN. For example, if the costumer's regular PIN is the date of that costumer's birthday, the PDN could be the date of a relative's birthday, such as a spouse. This would allow the customer to remember both the PIN and the PDN and not get the two mixed up.

The PDN generally could take any form, either a simple reversal of the normal PIN, e.g., 1234 would become 4321 (see FIG. 2), or a second number that is familiar to the cardholder, e.g., the last four digits of his home phone number might be the normal PIN and his work number the PDN. The only requirements for selecting the PDN is that the PDN number is not one that the victim will forget under stress nor enter by mistake when there is no duress.

Figure 12:
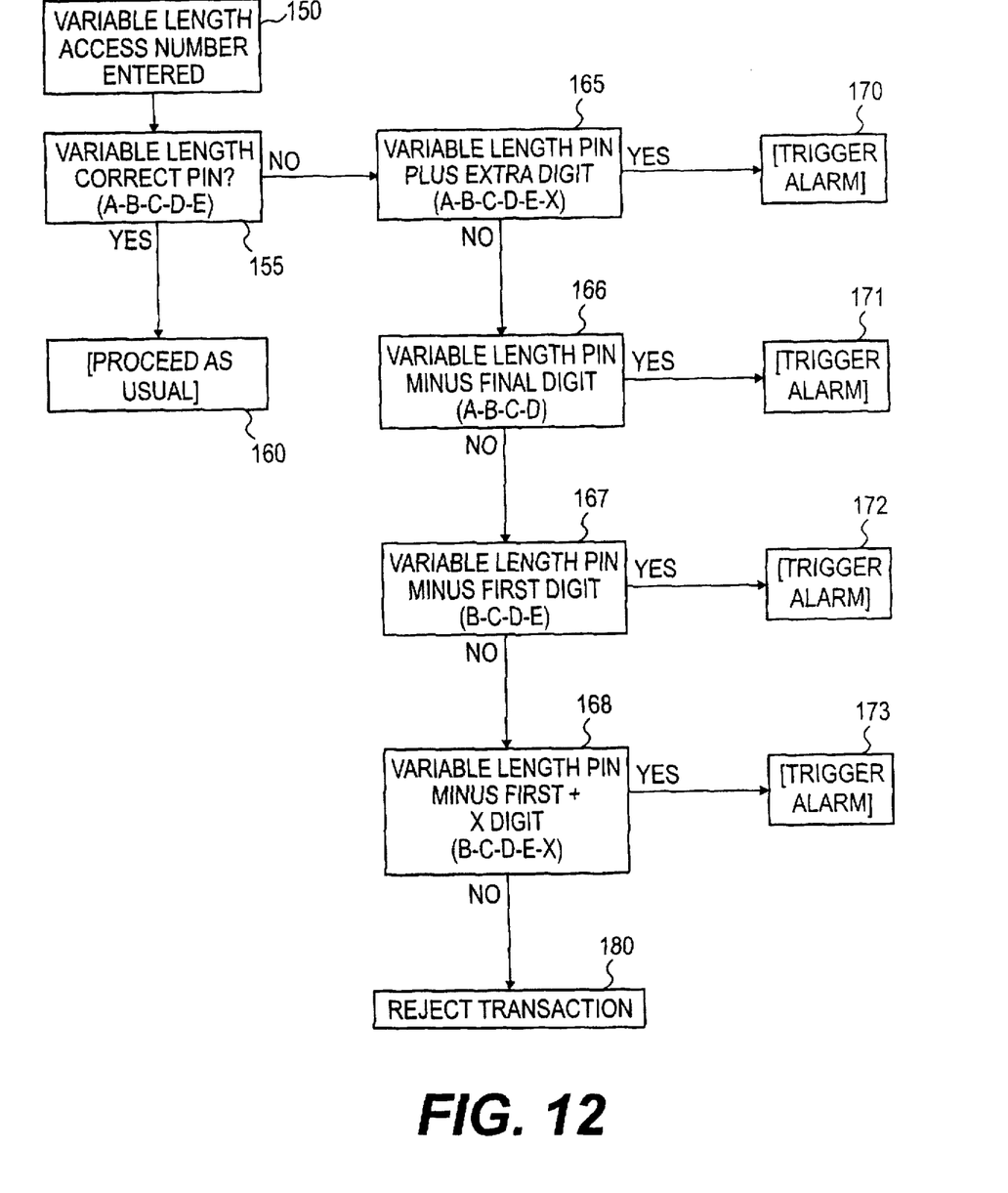
FIG. 12 is a flow chart of another alternate embodiment of the present invention wherein the PDN is part of the sequence of the PIN in a variable length PIN system.

A person could either select his own PDN in the same manner as he selects a PIN, or he could use his PIN as a reference for choosing the PDN, for example, 5329 could be 6430, by adding 1 to each digit in the PIN (see FIG. 12). There are other mathematical permutations that could be performed on a PIN to create a PDN, however the basic method of an alternate PIN being used as a PDN remains.

The system and method of the present invention works as follows. A customer after arriving at an ATM machine first enters a PIN number using the keyboard, generally indicated as step 50. The computer means then attempts to verify the PIN number at step 55. If the number entered was the costumer's correct PIN number, the transaction proceeds as usual, step 60.

Upon failure of the entered access number, the processor would be instructed to set a flag indicating a failed access number and attempt to verify the number as the customers PDN number, step 65. If the ATM processor verifies the entered access number as the customers PDN and the access flag is set, then the processor would be instructed to send a signal to alert the authorities, step 70, and then continue processing the transaction. If the processor does not verify the entered number as either the PIN or PDN, then the ATM processor will continue with ordinary failed access number procedures, step 80.

Certain limitations may be placed on the selection of a PDN. For example, 9369 might be too close to 9639 or 2458 would be too close to 4258, to avoid false alarms. If accidentally switching two adjacent numbers would result in a false alarm, the PIN/PDN combination might be unacceptable. Technically it could also work, but given the occurrence of dyslexia in the population, this could be a problem.

By assigning a second PIN, a Personal Distress Number or PDN, to a cardholder, the problems associated with ATM security and alarms would be solved. Even with a gun in the victim's back, the criminal would not know whether the normal PIN had been given or the PDN. Once the PDN had been given, the computer system, using an alarm system similar to a jewelry store's or a bank's burglar alarm, could immediately alert the nearest police station that a robbery was in progress which would dispatch police to the scene, providing a "real-time" response to the crime.

Conceivably, one PDN could be assigned to all of the customers of a given bank or ATM system. However, this would run the risk of the victim/cardholder forgetting the PDN or the criminal learning what the PDN for a certain bank is. In either instance, the victim would be in trouble.

Figure 6:
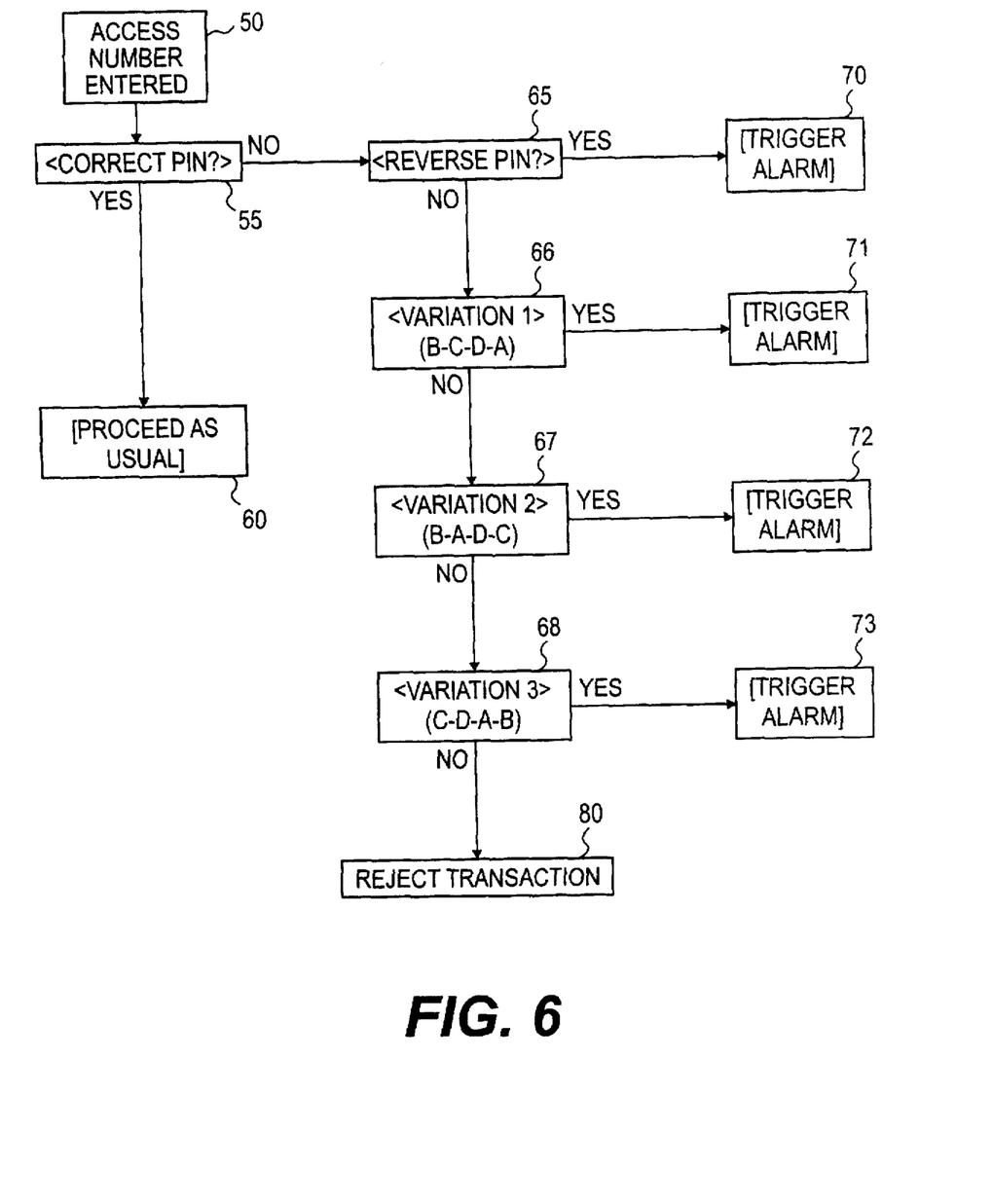
FIG. 6 is a flow chart of an alternate embodiment of the system and method of the present invention wherein the PDN is a variation of the PIN.

FIG. 6 illustrates an alternate embodiment or variation of the present invention, wherein the PDN is comprised of the same digits of the customers PIN, but entered in a different order. FIG. 2 illustrates how to expand the system to include reflexive and other variations. However, the preferred variation of the PIN number to be used as a PDN number is the reverse PIN.

The method illustrated in FIG. 2 works by changing the sequence of the PIN digits by the ATM user in a prearranged manner according to at least one prestored algorithm. For example, if a PIN number's digits are represented by the letters A-B-C-D, a related PDN would be represented by D-C-B-A, the reverse of A-B-C-D according to a first prestored algorithm. The processor which is making the PIN verification would be instructed to do the following: When a customer arrives at the ATM and enters an access number to attempt to use the ATM, step 50, the computer means or processor of the ATM attempts to verify the PIN number at step 55. If the number entered was the costumer's correct PIN number, the transaction proceeds as usual, step 60.

Upon failure of the entered access number, the processor would be instructed to set a flag indicating a failed access number and attempts to verify the entered access number as the PDN by reversing the change in the sequence according to the first prestored algorithm (i.e., convert D-C-B-A to A-B-C-D), step 65. If the processor verifies the modified access number as the customers PDN and the access failure flag is set, then the processor would be instructed to send a signal to alert the authorities, step 70, and continue processing the transaction.

Upon failure to verify the entered access number as a reverse PIN, the processor would be instructed to attempt to verify the entered access number as the PDN by changing the sequence by reading the last (fourth) digit first and then the first, second, and third according to a second prestored algorithm (i.e., convert B-C-D-A to A-B-C-D), step 66. If the processor verifies the modified access number as the customers PDN and the access failure flag is set, then the processor would be instructed to send a signal to alert the authorities, step 71, and continue processing the transaction.

Upon failure to verify the entered access number by reading the last digit first, the processor would be instructed to attempt to verify the entered access number as the PDN by changing the sequence by reversing the first two digits and reversing the second two digits according to a third prestored algorithm (i.e., convert B-A-D-C to A-B-C-D), step 67. If the processor verifies the modified access number as the customers PDN and the access failure flag is set, then the processor would be instructed to send a signal to alert the authorities, step 72, and continue processing the transaction.

Upon failure to verify the entered access number by reversing both the first two and reversing the second two digits, the processor would be instructed to attempt to verify the entered access number as the PDN by changing the sequence by reversing the first two digits with the second two digits according to a fourth prestored algorithm (i.e., convert C-D-A-B to A-B-C-D), step 68. If the processor verifies the modified access number as the customers PDN and the access failure flag is set, then the processor would be instructed to send a signal to alert the authorities, step 73, and continue processing the transaction.

If the processor does not verify the new modified access number as a PDN, then continue with ordinary failed access number procedures, step 80.

For a variety of reasons, the reverse PIN is the best possible choice for a duress PIN or PDN. What is important is coming up with a method that will allow the user to call for help while under great stress, that will not alert the robber that help has been notified and that will not be accidentally entered by a person not under duress. Having two PIN numbers, one regular and one duress, would theoretically be just as effective, provided that the person didn't forget what the duress PIN was. Changing the order in other ways would also work, e.g., C-D-B-A or D-A-B-C. In practice, a PDN that was inversive or reflexive would also be acceptable. For example, PIN 1-2-2-1 would become PDN 2-1-1-2.

Furthermore, all of these variations could also be added to the same system that uses a reverse PIN system.

It should be understood that other variations are also possible. The computer could run through any number of variations as desired. It should also be understood that the ATM processor could be limited to one or a number of the above variations or other variations.

Figure 7:
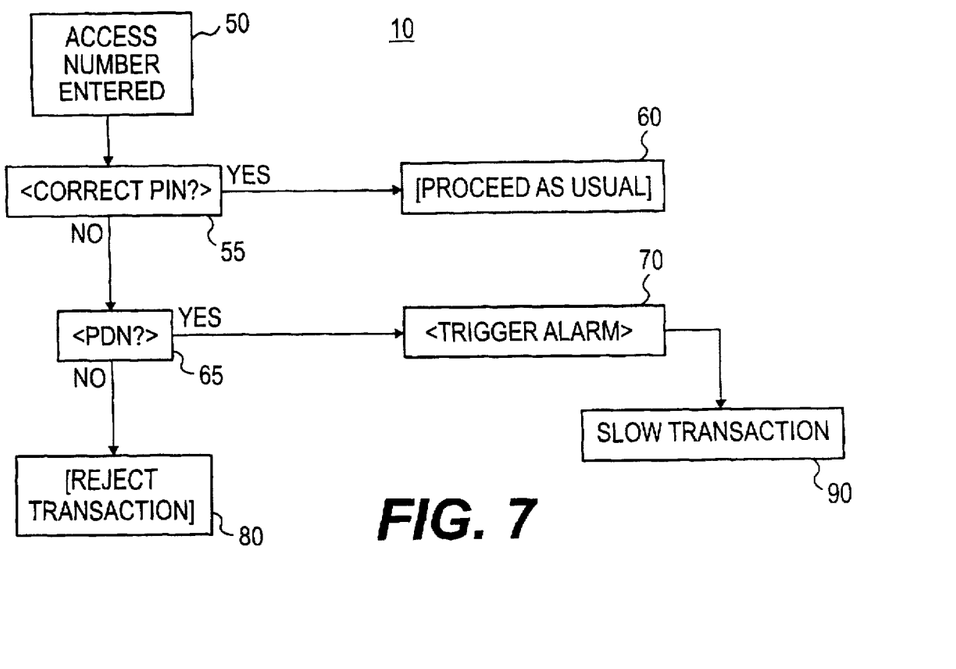
FIG. 7 is an expanded flow chart of the system and method of the present invention of FIG. 5.

FIG. 7 illustrates an expanded flow chart of FIG. 5. After an access number has been entered, step 50, and a PDN verified, step 65, the silent alarm or distress call is triggered, step 70. The system can take various actions.

For example, the whole transaction could be slowed down, step 90, i.e., the entire transaction process could be delayed such that the system takes longer to dispense the cash. In this manner, the notified authorities will have more time to respond to the distress signal. The slowed transaction could take several forms. The system could at first refuse the request and give out a fake "out of service" message or "Error—Please try again" message. The customer would have to restart the transaction. Preferably, the system would merely stall for time by slowing down the generation of user instruction screens and then giving a "Transaction in Progress" message. Ultimately, the system should dispense cash (that would be debited to the person's account or not, depending), so that the robber does not become agitated and harm the victim.

Figure 8:
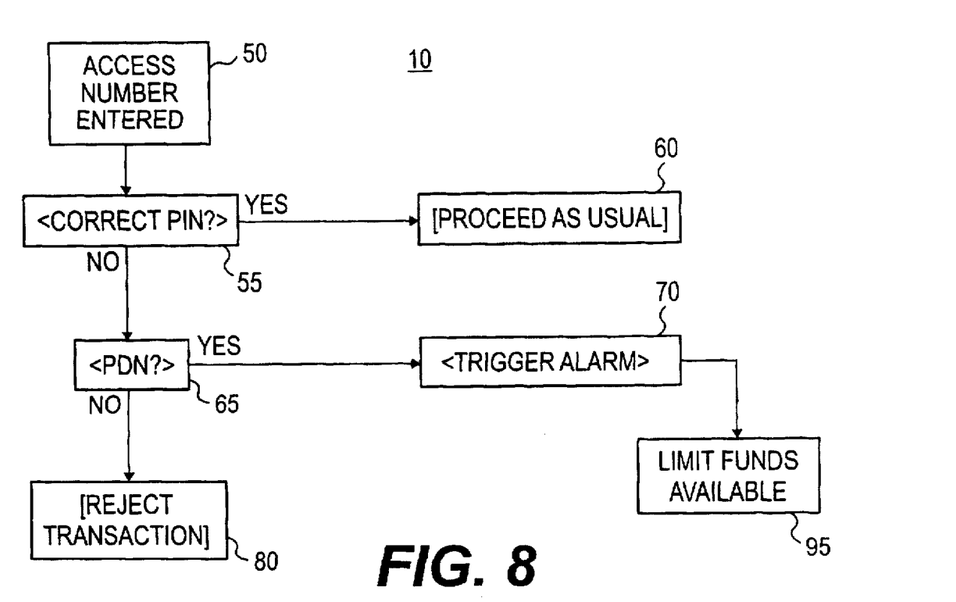
FIG. 8 is an alternate expanded flow chart of the system and method of the present invention of FIG. 5.

FIG. 8 illustrates another alternate expanded flow chart of FIG. 5. After the alarm has been triggered, step 70, the computer could automatically limit the funds available to be dispensed, step 95. If, for example, more than $50.00 is requested to be withdrawn, the system could provide a message stating "Your Request Exceeds the Maximum Allowable Withdrawal at this Machine". Because most ATM cards have a $500 daily limit, and a maximum of $300 from any single ATM terminal, a refinement of this idea would involve alerting the entire ATM network that the cardholder is under duress. If the card is inserted into a second ATM, the second ATM would instantly alert the police, without waiting for the duress PIN being entered. If the police aren't fast enough to the scene of the first withdrawal, they will have a few extra seconds to respond to the second ATM alarm.

It should be understood that after the alarm has been triggered, the ATM system could do one or more of the steps illustrated in FIGS. 7 and 8.

Figure 9:
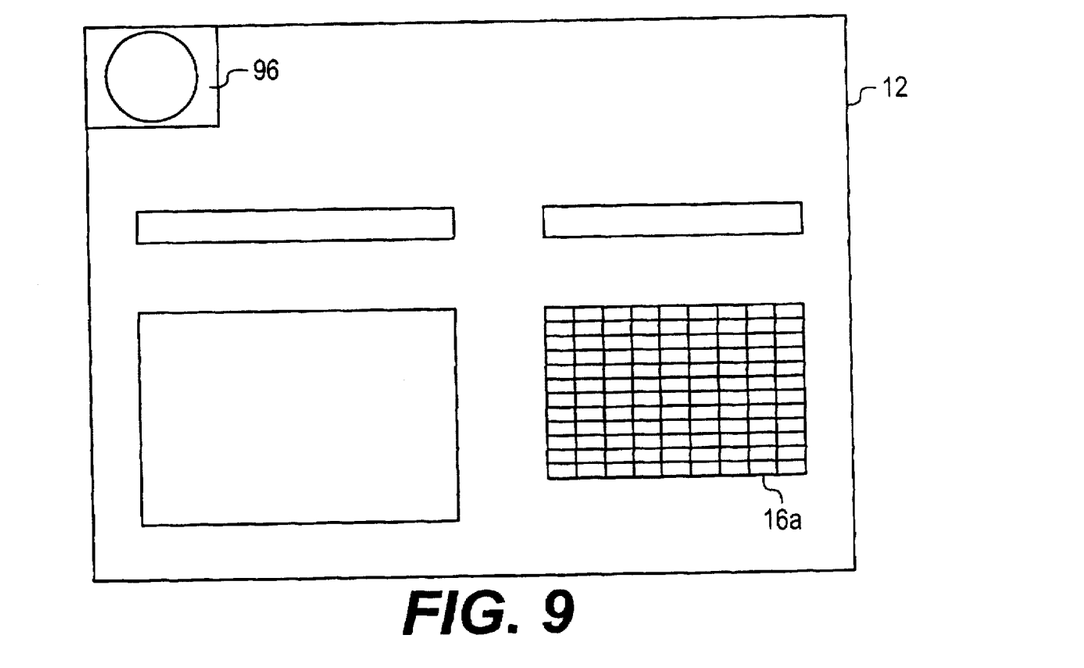
FIG. 9 is a front view of an automatic teller machine in use with the present invention.
Figure 10:
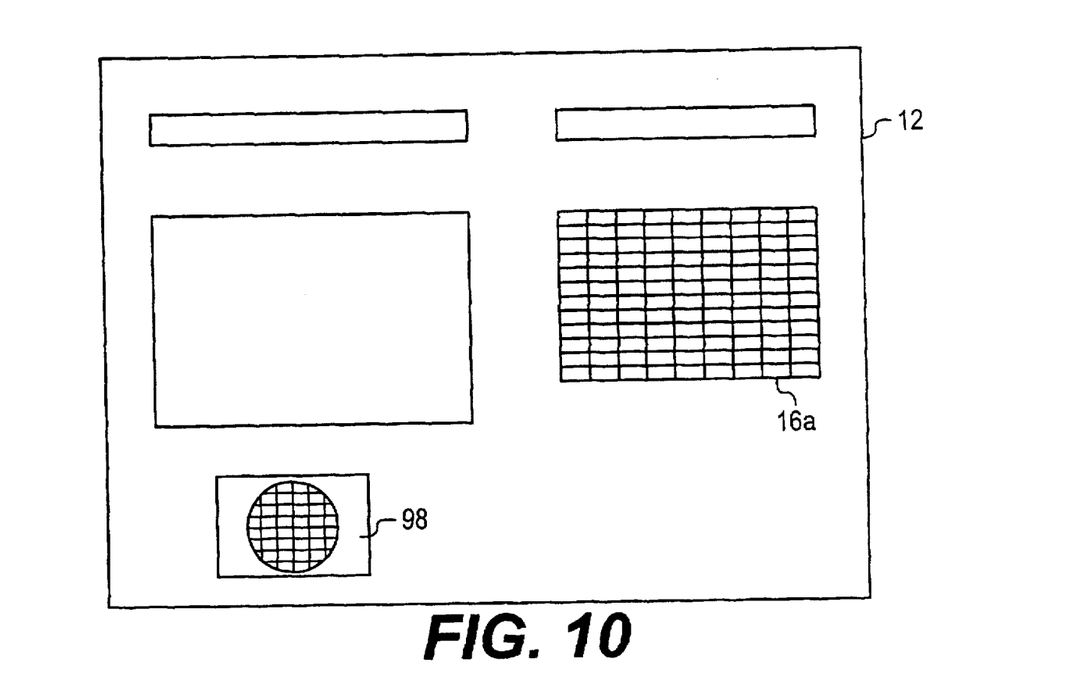
FIG. 10 is a front view of an alternate automatic teller machine in use with the present invention.

For example, a bank could install equipment to record occurrences in proximity to the ATM machine. FIG. 9 illustrates an ATM machine having a low light level camera or videorecorder 96 to photograph or videotape the area immediately surrounding the ATM machine to capture the criminal on film. Camera 96 could be activated upon the identification of a PDN. Similarly, FIG. 10 illustrates an ATM machine having a microphone 98 to record voices for later identification. When a PDN is entered, this microphone could be activated to record any sounds or voices, as an additional step to be performed after step 70.

As is further seen in FIGS. 9 and 10, ATM machines 12 include an alpha-numeric keypad 16a. Accordingly, the system and method of the present invention is also applicable to an alpha-numeric system. That is, the PIN or access code could include the use of words or letters in addition to, or in place of numbers only. For example, the access code or PIN for a customer might be "AARDVARK", while the duress code or PDN could be "XYLOPHONE1".

Figure 11:
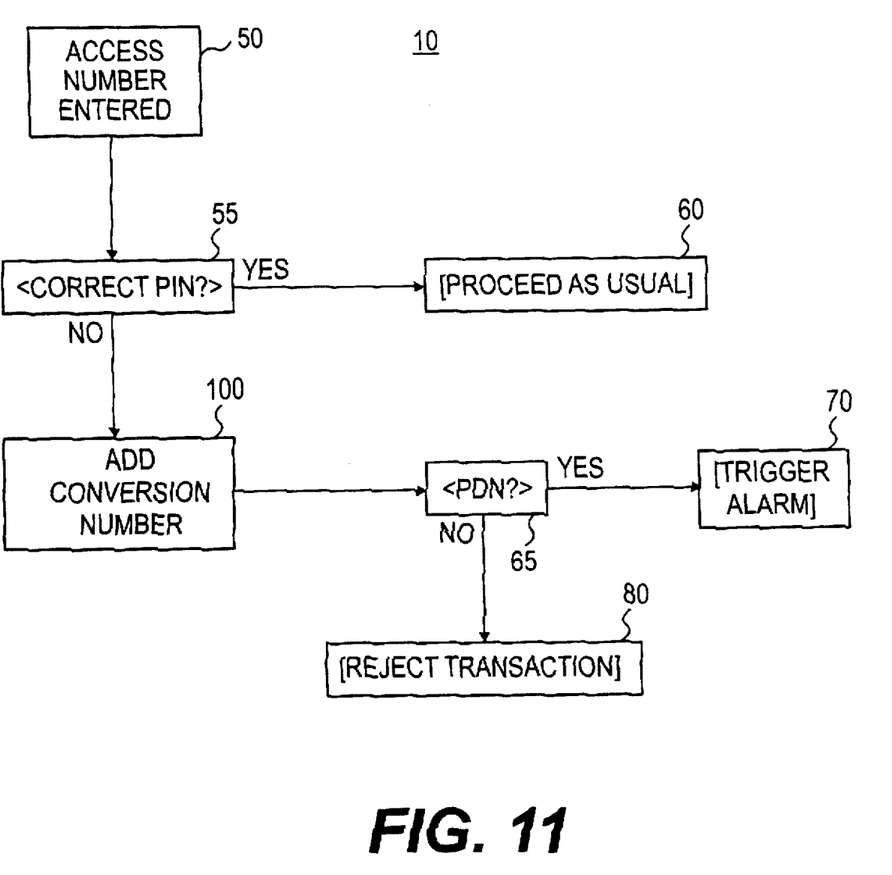
FIG. 11 is a flow chart of another alternate embodiment of the present invention wherein the PDN is the PIN modified by a conversion number.

FIG. 11 illustrates an alternate embodiment or variation of the general PDN system and method of the present invention 10. This method is accomplished by storing in the Customer's Information File in the ATM system, a conversion number, which when combined with the ATM user's PDN will yield the Customer's PIN.

Upon failure of the entered access number, the processor would be instructed to set a flag indicating a failed access number and combine the conversion number with the entered access number, and try to verify the number entered as the PIN number again, step 100. If combining the entered number with the conversion number results in a PIN match, then the entered number is verified as the customers PDN, step 65, and the PIN failure flag is set. The processor is instructed to notify authorities to the fact that a customer has entered their distress number, step 70, and continue processing the transaction. If the processor does not verify the new modified access number, then the computer will continue with ordinary failed access number procedures, step 80.

For example, let A-B-C-D represent a four digit prestored PIN number and let X-X-X-X represent the conversion number, wherein X represents any number encompassed in one of the prestored algorithms (positive or negative). When a user enters an access number of (A+X)-(B+X)-(C+X)-(D+X), the ATM's computer simply adds the access number to the conversion number according to the prestored algorithm. If this modified access number is then equal to the PIN number, the alarm will sound. Therefore, if a user's PIN is 4567 and the conversion number is 1111, when the user enters 3456 (the PDN), 3456 and 1111 will be combined to arrive at 4567 and the alarm will sound. Similarly, if a user's PIN is 4567 and the conversion number is (−1) (−1) (−1) (−1), when the user enters 5678 (the PDN), 5678 and (−1) (−1) (−1) (−1) will be combined to arrive at 4567 and the alarm will sound.

Again, what is most important about this idea is that it is easily memorized, will be useful under stress, will not result in false alarms and will not alert the robber that an alarm has been given. The ATM's communication device would send out an emergency signal for police help.

Also of great importance is the ease with which the system of the present invention may be added to a typical ATM system and thereafter maintained. The algorithms associated with this system need only be incorporated into the banks computers. The bank need not program and maintain a separate prestored PDN number into the banks computers for each account to which access is provided via an ATM. Furthermore, the bank is not required to manufacture new cards for each such account or reprogram old cards to include a PDN number thereon. Accordingly, the costs of implementing and maintaining the system of the present invention are a mere fraction of the costs of prior art systems.

FIG. 12 illustrates another alternate embodiment of the present invention which solves the problem of adding an emergency digit to a set number of digits PIN system (for example four digit PIN systems), which could alert the robber and result in harm to the victim. This embodiment of the present invention comprises issuing PIN numbers of a random number of digits, such as three, four, five or six digits. Different customers would have a different number of digits in their PIN. Accordingly, the use of a PDN having an extra digit or a dropped digit would safely trigger the alarm without letting the robber know that the authorities have been signaled.

For example, if the bank issues various length PIN numbers to its customers (such as three, four, five, six, or seven digits, etc.) a victim, whose normal PIN is for example five digits, could enter a sixth digit, thus triggering the alarm. Similarly, with this embodiment of the invention, a customer could use a shorter PDN than his PIN by dropping the first or the last digit. Additionally, the PIN and the PDN could be the same length by dropping the first digit and adding an extra digit.

The variable length PIN embodiment of the present invention is illustrated in the flow chart of FIG. 12, wherein ABCDE represents, by way of example only, a costumer's variable length PIN and X represents any extra digit.

Accordingly, the customer first enters a variable length access number to attempt to use the ATM, step 150. The computer means or processor of the ATM then attempts to verify the number as the costumer's variable length PIN (ABCDE) at step 155. If the number entered was the costumer's correct PIN number, the transaction proceeds as usual, step 160.

Upon failure of the entered access number, the processor would be instructed to set a flag indicating a failed access number and attempt to verify the entered access number as the PDN by recognizing the access number as the PIN plus X, i.e., ABCDEX., step 165. If the processor verifies the access number as the customers PDN and the access failure flag is set, then the processor would be instructed to send a signal to alert the authorities, step 170, and continue processing the transaction.

Upon failure to verify the entered access number as the PIN plus X, the processor would be instructed to attempt to verify the entered access number as the PDN by recognizing the entered access number as the PIN minus the last digit or ABCD, step 166. If the processor verifies the access number as the customers PDN and the access failure flag is set, then the processor would be instructed to send a signal to alert the authorities, step 171, and continue processing the transaction.

Upon failure to verify the entered access number as the PIN minus the last digit, the processor would be instructed to attempt to verify the entered access number as the PDN by recognizing the access number as the PIN minus the first digit or BCDE, step 167. If the processor verifies the access number as the customers PDN and the access failure flag is set, then the processor would be instructed to send a signal to alert the authorities, step 172, and continue processing the transaction.

Upon failure to verify the entered access number as the PIN minus the first digit, the processor would be instructed to attempt to verify the entered access number as the PDN by recognizing the access number as the PIN minus the first digit plus X, i.e., BCDEX, step 168. If the processor verifies the access number as the customers PDN and the access failure flag is set, then the processor would be instructed to send a signal to alert the authorities, step 173, and continue processing the transaction.

If the processor does not verify the access number as a PDN, then it will continue with ordinary failed access number procedures, step 180.

In general, the PIN could be N digits in length and the PDN could be either N−1, N, or N+1 digits. By expanding the range of PIN lengths, the PDN length could also be shortened or lengthened as required. There is no requirement that the extra digit be specifically designated. That is, any digit in the N+1 position could be used to trigger the alarm system. All the customer has to know is to press any extra digit he wants to. Similarly, the customer could choose to omit the first or last digit of their PIN. The computer will "recognize" either that part of the correct sequence was given, but not all of it, or that the entire proper sequence was given plus an extra digit, and the alarm will be triggered. So long as enough of the sequence is entered, the computer could recognize the identity of the user, and the difference between the PIN and the PDN would not be noticeable or tip off the criminal because the PINs would be variable length.

Figure 13:
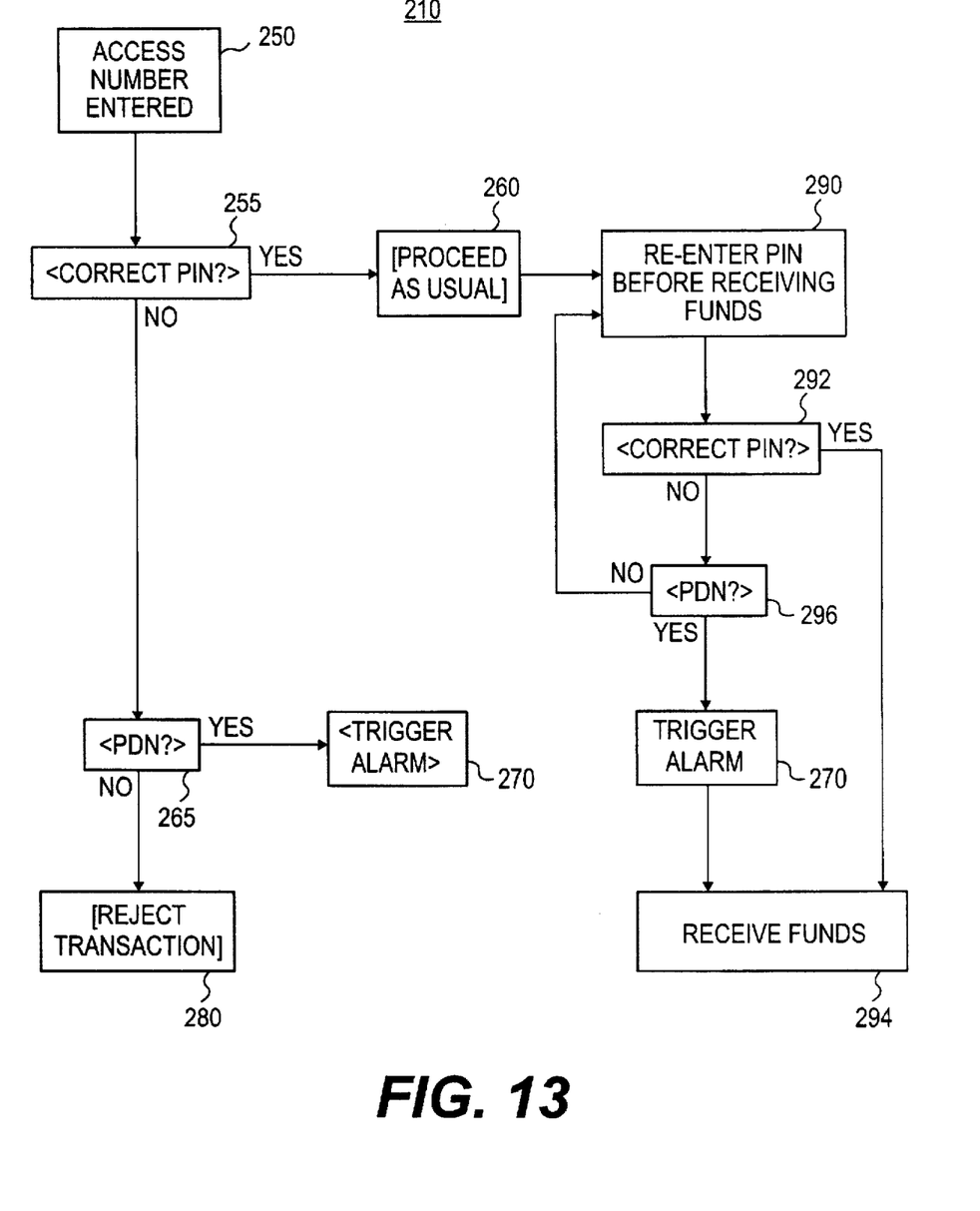
FIG. 13 is a flow chart of another alternate embodiment of the present invention wherein the PIN/PDN must be entered before receiving funds.

FIG. 13 illustrates another alternate embodiment of the present invention which allows discreet identification and notification of a duress transaction which may arise during or in the midst of an ATM transaction, rather than before or at the start of the transaction. If a robber were to approach an ATM user after the user has entered the correct PIN number, that user would have no way of notifying the police. Accordingly, the present invention 210 of FIG. 13 solves this problem by requiring all users to re-enter their PIN/PDN number just prior to receiving funds.

Accordingly, a user approaches an ATM machine and enters an access number, step 250. The computer means of the ATM machine then attempts to verify the entered number as the user's PIN, step 255. If the user's correct PIN was not entered, the computer means attempts to verify the access number as the user's PDN, step 265. If the user's PDN was entered, the communication device in the ATM would notify the appropriate authorities, step 270, and then proceed with the transaction. If neither the PIN or the PDN have been entered, the ATM will reject the transaction, step 280.

If the user entered the correct PIN, then the ATM transaction would proceed as usual, step 260. However, after the user has entered the amount of cash to be received, the ATM will require the user to re-enter the PIN number before receiving the cash, step 290. Accordingly, should a robber approach the user after initially entering the correct PIN, or at step 260, the user can still discreetly notify the authorities.

Upon being prompted to re-enter the PIN number at step 290, the user has the option of entering either the PIN or the PDN. When the user enters a number, the computer means attempts to verify the entered number as the user's correct PIN, step 292. If the correct PIN has been entered, the user will receive the funds, step 294. If the correct PIN has not been entered, the computer means will attempt to verify the entered number as the user's PDN, step 296. If the user has entered the PDN at step 290, the communication device of the PDN will notify the appropriate authorities, step 270. If neither the PIN or PDN have been entered at step 290, the ATM will provide an error message and prompt the user to re-enter the number for verification. If the entered number is unable to be verified after a certain number of tries, three for example, the ATM would at this point reject the transaction.

Invention 210 provides the user an additional chance to discreetly identify a duress transaction and notify the appropriate authority. By requiring users to re-enter their PIN number just prior to receiving funds, step 290, the user has two opportunities to discreetly notify the authorities of a duress transaction. Therefore, the user can discreetly and safely notify the police of a distress transaction at any time during the ATM transaction.

The system and method of the present invention is also very useful should a criminal take a victim's ATM card and force the victim to tell the criminal the PIN number. If this were to occur, the criminal could then commit the crime a short time later without the victim being there, while an accomplice stays with the victim until verification by the criminal of ill-gotten funds. For the system and method to work, the victim only needs to tell the criminal the PDN number instead of the PIN number, and the criminal would effectively call the police himself. Then if the ATM machine, after having had the PDN entered, slows down the transaction, the police will have added time to arrive and apprehend the criminal.

Further, the system and method of the present invention could incorporate voice recognition devices, similar to those used in sophisticated telephone answering systems, to be used along with or in place of the ATM's keypad. In this case, the user's card will be used to initiate the ATM transaction, then the voice recognition device will allow access to the system. After the user inserts the ATM card, the user would then speak a password into a microphone. This password would take the place of a PIN number. Similarly, the user will have a distress password which would work in the same manner as the PDN of the present invention.

By way of illustration, steps 50, 55, and 65 of FIGS. 5, 7 or 8 would be achieved via the microphone and voice recognition device, rather than the keypad and computer means. The voice recognition device would recognize human speech, attempt to identify the speaker, attempt to identify the password, attempt to identify the distress password if the user's normal password is not identified, and then trigger the silent alarm if the distress password is identified.

The embodiments of the present invention disclosed herein have numerous benefits and advantages, as stated above. Furthermore, because the cardholder has been immediately identified by the computer upon the triggering of the alarm, the police will know who is in trouble, what that person looks like, what kind of car they drive, etc. The benefits to the police would mean, in some cases, the difference between life and death.

This idea has applications that go beyond simple ATMs. Virtually any situation where computer access to valuable property or information is regularly used could make use of this system. For example keyless auto entry systems such as the system Ford Motors uses for its cars, could incorporate the system and method of the present invention. The car's cellular phone could be linked to the entry system, whereupon detection of a PDN by the central processing unit of the car's entry system could instruct the telephone dialer having a pre-recorded message to discreetly notify the police. The car's location could be identified by a number of available car tracking systems.

The PDN idea can also be used in systems where access to a system is initiated by means other than an ATM card. For example, telephone credit card calls are initiated by entering "0"+the called number+the caller's telephone number+the caller's PIN. Access to an ATM could be initiated in the same manner. A customer could approach an ATM, enter his phone number (or an assigned number)+PIN and conduct the transaction. In this case, substituting a PDN for a PIN would serve the same purpose as the PDN in a bank card system.

In fact, a worldwide network of ATMs could function on such a system. For example, an American tourist in Hamburg, Germany could log onto an ATM by entering his (country code)+(telephone number) (PIN/PDN) to initiate the transaction. For instance, the customer in Hamburg enters his access number [011 (country code)]+[8152243312 (telephone number)]+[1234 or 4321 (PIN/PDN)]. The only requirement of such a system might be that the PIN and PDN be significantly different from the PIN and PDN of a similar telephone number of the same country to avoid false alarms by an inadvertent switching of digits in the country code, the telephone number, or the PIN/PDN.

The system need not be based directly on the telephone number system. The system could be based on its own assigned numbers that are independent of the telephone number system. Other methods of accessing are also possible. Whether the initial access to the computer system is by means of a standard ATM card, voice recognition, retina scan, or any other means, it is the addition of the PDN that makes the system functional. Accessing an account could also be made by use of an alpha-numeric keypad and an alpha-numeric access code+PIN/PDN. Because the correct PIN is unknown to the criminal, the victim can enter the PDN instead of the PIN, thus summoning the police.

It is to be understood that the embodiments herein described are merely illustrative of the principles of the present invention. Various modifications may be made by those skilled in the art without departing from the spirit or scope of the claims which follow.

What is claimed is:

1. An improved system for identifying a duress transaction at a remote transaction terminal of an automated banking system having a display, a keypad, a card reader for reading a banking card, a cash dispenser, and computer means for detecting an access number, said system comprising:

means for checking said access number with a personal identification number which is prestored on one of said system and said banking card;

whereby said system proceeds to allow a transaction if said access number is the same as said prestored personal identification number;

means for facilitating recall of a non-prestored personal distress number, said means for facilitating recall including means for storing at least one algorithmic function for modifying one of said prestored personal identification number and said access number;

means for verifying said access number as said non-prestored personal distress number by verifying one of an algorithmically modified access number as being the same as said prestored personal identification number, and an algorithmically modified prestored personal identification number as being the same as said access number; and means for discreet identification and notification of said duress transaction upon verification of said access number as being said non-prestored personal distress number;

whereby said system facilitates the recall of said non-prestored personal distress number.

2. The system of claim 1, further comprising:

computer initiated means for unnoticeably slowing down said distress transaction upon discreet identification and notification of said duress transaction by said means for discreet identification and notification.

3. The system of claim 1, further comprising:

means for limiting funds available to be dispensed by said cash dispenser upon discreet identification and notification of said duress transaction by said means for discreet identification and notification.

4. The system of claim 1, further comprising:

means for recording occurrences in proximity to said remote transaction terminal upon discreet identification and notification of said duress transaction by said means for discreet identification and notification.

5. The system of claim 1, wherein said personal identification number comprises a plurality of digits, and said non-prestored personal distress number comprises a second plurality of digits differing in number from said first plurality of digits.

6. The system of claim 1, wherein said personal identification number comprises a sequence of digits, and said non-prestored personal distress number comprises a variation of said sequence of said digits.

7. The system of claim 1, wherein said personal identification number comprises a first set of digits, and said non-prestored personal distress number comprises a second set of digits equal to said first set of digits modified by a personal distress conversion number.

8. The system of claim 1, wherein said personal identification number comprises a first set of digits of random length, and said non-prestored personal distress number comprises a second set of digits equal to said first set of digits plus an additional digit.

9. The system of claim 1, wherein said personal identification number comprises a first set of digits of random length, and said non-prestored personal distress number comprises a second set of digits equal to said first set of digits minus a digit.

10. The system of claim 1, wherein said means for identification and notification includes a silent alarm.

11. The system of claim 1, wherein said at least one algorithmic function comprises a plurality of algorithmic functions.

12. An improved system for identifying a duress transaction at a remote transaction terminal of an automated banking system having a display, a card reader for reading a banking card having a personal access password stored thereon, and a cash dispenser, said system comprising:

voice recognition means for detecting human speech;

means for checking said human speech with a personal access password which is prestored on one of said system and said banking card;

whereby said system proceeds to allow a transaction if said human speech is the same as said prestored personal access password;

means for facilitating recall of a non-prestored personal distress password, said means for facilitating recall including means for storing at least one logical step for modifying one of said prestored personal access password and said human speech according to said at least one logical step;

means for verifying said human speech as said non-prestored personal distress password by verifying one of said human speech as modified by said at least one logical step being the same as said prestored personal access password, and said prestored personal access password as modified by said at least one logical step being the same as said human speech; and means for discreet identification and notification of said duress transaction upon verification of said human speech as said non-prestored personal distress password;

whereby said system facilitates the recall of said non-prestored personal distress password.

13. An improved method for the identification and notification of a duress transaction at a remote transaction terminal of an automated banking system having a display, a keypad, a card reader for reading a banking card, a cash dispenser, and computer means for processing a banking transaction, said method comprising the steps of:

storing a personal identification number in one of said computer means and said banking card;

providing a means for checking said personal identification number in said computer means;

providing a means for storing at least one algorithmic function;

facilitating recall of said non-prestored personal distress number;

entering an access number via said keypad into said terminal to begin a transaction;

verifying said access number as said personal identification number whereby said method proceeds to allow a banking transaction upon verification of said access number as said personal identification number;

providing a means for modifying one of said personal identification number and said access number according to said at least one algorithmic function;

providing a means for verifying said access number as said non-prestored personal distress number by verifying one of an algorithmically modified access number as being the same as said personal identification number, and;

an algorithmically modified personal identification number as being the same as said access number; and triggering a duress signal upon successful recognition of said access number as being said non-prestored personal distress number;

whereby said method facilitates recall of said non-prestored personal distress number.

14. The method of claim 13, further comprising the step of:

delaying transaction time of said remote terminal upon said triggering of said duress signal.

15. The method of claim 13, further comprising the step of:

limiting the funds available to be dispensed by the cash dispenser upon said triggering of said duress signal.

16. The method of claim 13, further comprising the step of:

recording occurrences in proximity to said remote transaction terminal upon said triggering of said duress signal.

17. An improved method for the identification and notification of a duress transaction at a remote transaction terminal of an automated banking system having a display, a keypad, a card reader for reading a banking card, a cash dispenser, and computer means for processing a banking transaction, said method comprising the steps of:

storing a personal identification number in one of said computer means and said banking card;

providing a means for checking said personal identification number in said computer means;

providing a means for storing at least one algorithmic function means;

facilitating recall of said non-prestored personal distress number;

entering an access number comprising a sequence of digits via said keypad into said terminal to begin a transaction;

verifying said access number as said personal identification number whereby said method proceeds to allow a transaction if said access number is the same as said personal identification number;

providing a means for modifying one of said personal identification number and said access number according to said algorithmic function;

attempting to recognize said access number as being said personal identification number modified into said non-prestored personal distress number by varying the sequence of said access number digits to equate said access number to said personal identification number upon failure to verify said access number as said non-prestored personal distress number;

triggering a duress signal upon successful verification of said access number as being the same as said non-prestored personal distress number;

whereby said method facilitates recall of said non-prestored personal distress number.

18. The method of claim 17, wherein said step of attempting to verify said access number as being said personal identification number modified into said non-prestored personal distress number by varying the sequence of said access number digits is repeated a predetermined number of times.

19. The method of claim 17, further comprising the step of:

delaying transaction time of said remote terminal upon said triggering of said duress signal.

20. The method of claim 17, further comprising the step of:

limiting the funds available to be dispensed by the cash dispenser upon said triggering of said duress signal.

21. The method of claim 17, further comprising the steps of:

proceeding with said banking transaction upon successful verification of said personal identification number;

entering a verification number before receiving banking funds;

attempting to verify said verification number as said personal identification number;

attempting to verify said verification number as being said personal identification number modified into said non-prestored personal distress number upon failure to verify said verification number as said personal identification number; and triggering a duress signal upon successful verification of said non-prestored personal distress number.

22. An improved method for the identification and notification of a duress transaction at a remote transaction terminal of an automated banking system having a display, a keypad, a card reader for reading a banking card, a cash dispenser, and computer means for processing a banking transaction, said method comprising the steps of:

storing a personal identification number in one of said computer means and said banking card;

providing a means for verifying said personal identification number in said computer means;

facilitating recall of a non-prestored personal distress number;

entering an access number via said keypad into said terminal to begin a transaction whereby said method proceeds to allow a banking transaction if said access number is the same as said personal identification number;

attempting to verify said access number as said personal identification number;

providing a means for storing at least one personal distress conversion number;

providing a means for modifying one of said personal identification number and said access number according to said at least one personal distress conversion number;

providing a logical conversion means for recognizing said access number as being said personal identification number modified by said predetermined personal distress conversion number into said non-prestored personal distress number; and triggering a duress signal upon verification of said access number as being said personal identification number modified by said predetermined personal distress conversion number into said non-prestored personal distress number;

whereby said method facilitates recall of said non-prestored personal distress number.

23. The method of claim 22, further comprising the step of:

delaying transaction time of said remote terminal upon said triggering of said duress signal.

24. The method of claim 22, further comprising the step of:

limiting the funds available to be dispensed by the cash dispenser upon said triggering of said duress signal.

25. An improved system for the discreet identification and notification of a duress transaction at a remote transaction terminal of an automated banking system upon the entering of a non-prestored emergency number, said remote transaction terminal having a display, a card reader for reading a banking card, a cash dispenser, computer means for processing a banking transaction, and means for verifying a personal identification number of a first set of digits having a last digit wherein said personal identification number is prestored on one of said system and said banking card, said improved system comprising:

means for checking an entered access number of a second set of digits with said personal identification number of said first set of digits;

whereby said system proceeds to allow a banking transaction if said entered access number is the same as said prestored personal identification number;

algorithmic function means for recognizing said entered access number of a second set of digits as being said personal identification number modified into said non-prestored emergency number when said entered access number corresponds to said personal identification number according to at least one algorithmic function, said at least one algorithmic function modifying one of said personal identification number and said entered access number in at least one of the following manners, (a) said second set of digits of said access number match said first set of digits of said personal identification number in any varying sequence, (b) said second set of digits of said access number equal said first set of digits of said personal identification number minus at least said last digit, (c) said second set of digits of said access number equal said first set of digits of said personal identification number plus at least an additional digit, (d) said second set of digits of said access number equal said first set of digits of said personal identification number plus a predetermined offset number; and means for discreet notification of said duress transaction upon recognition of said non-prestored emergency number by said means for recognizing;

whereby said system facilitates recall of said non-prestored emergency number.

26. The system of claim 25, wherein said varying sequence is defined as said first set of digits being represented by the letter sequence A B C D, and said second set of digits being D C B A.

27. The system of claim 25, wherein said varying sequence is defined as said first set of digits being represented by the letter sequence A B C D, and said second set of digits being B A D C.

28. The system of claim 25, wherein said predetermined offset number being represented by the letter sequence X X X X, said first set of digits being represented by the letter sequence A B C D, and said second set of digits being (A+X) (B+X) (C+X) (D+X).

29. The system of claim 28, wherein X is a positive integer.

30. The system of claim 28, wherein X is a negative integer.

31. An improved method for the discreet identification and notification of a duress transaction at a remote transaction terminal of an automated banking system upon entering a non-prestored emergency number, said remote transaction terminal having a display, a card reader for reading a banking card, a cash dispenser, and computer means for processing a banking transaction, said improved method comprising the steps of:

> storing a personal identification number of a first set of digits including a last digit in one of said computer means and said banking card;
>
> providing a means for recognizing an access number of a second set of digits entered into said terminal to authorize a transaction;
>
> providing means for checking said access number with said personal identification number;
>
> whereby said method proceeds to allow a banking transaction if said access number is the same as said personal identification number;
>
> providing means for storing a logical step;
>
> providing a means for modifying one of said personal identification number and said access number according to said logical step;
>
> providing a logical step means for recognizing said access number as said non-prestored emergency number being a formative of said personal identification number;
>
> facilitating recall of said non-prestored emergency number by directly correlating said personal identification number to said non-prestored emergency number via said logical step; and
>
> triggering a duress signal upon the recognition of at least one of the following occurrences,
>
> > (a) said second set of digits of said access number match and said first set of digits of said personal identification number in any varying sequence,
> >
> > (b) said second set of digits of said access number equal said first set of digits of said personal identification number minus at least said last digit,
> >
> > (c) said second set of digits of said access number equal said first set of digits of said personal identification number plus at least an additional digit,
> >
> > (d) said second set of digits of said access number equal said first set of digits of said personal identification number plus a predetermined offset number;
>
> whereby said method facilitates recall of said non-prestored emergency number.

* * * * *